Sept. 5, 1967    H. C. MORROW    3,339,818
SELF-CENTERING ROLL
Filed June 8, 1965
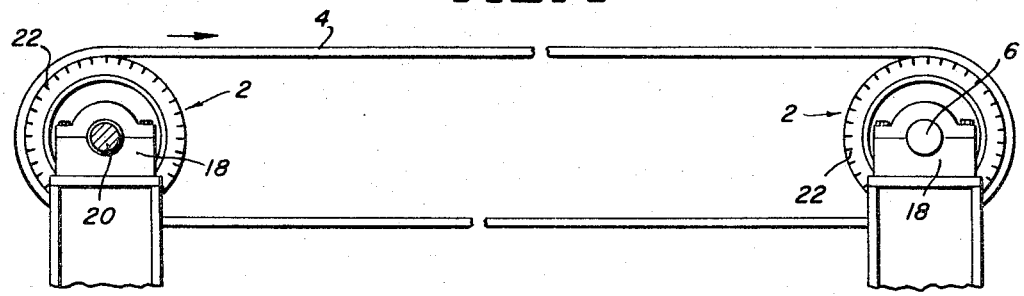
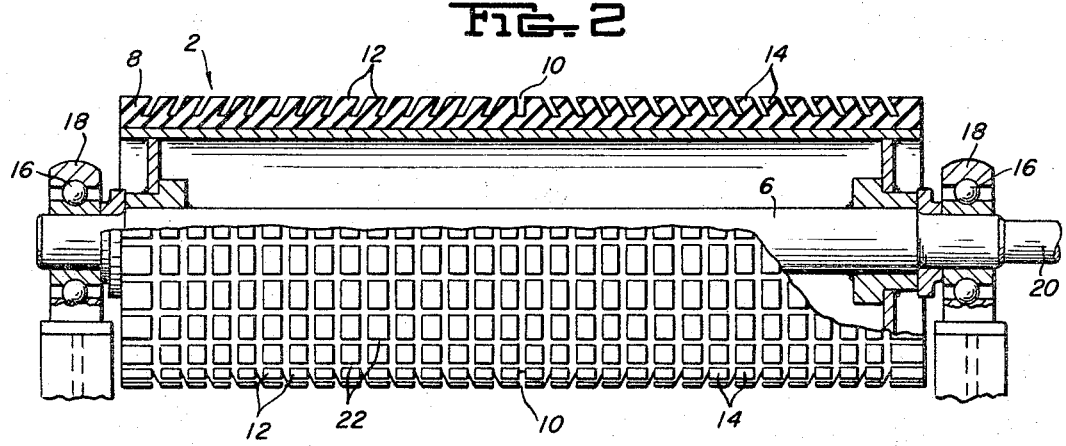
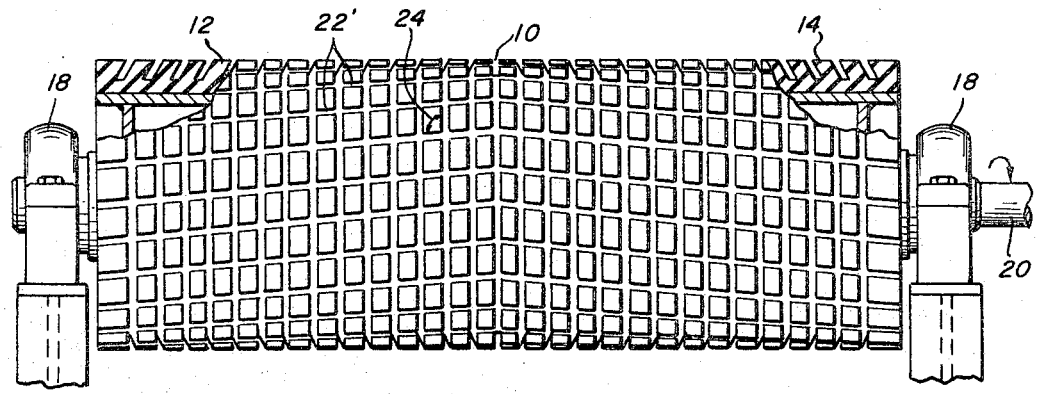
INVENTOR
HARRY C. MORROW
By Donald G. Dalton
Attorney 3,339,818
SELF-CENTERING ROLL
Harry C. Morrow, Bethel Park, Pa., assignor to United States Steel Corporation, a corporation of Delaware
Filed June 8, 1965, Ser. No. 462,205
3 Claims. (Cl. 226—190)

This invention relates to self-centering rolls and more particularly to peripheral slotted or slit rubber covered self-centering rolls of the type shown in Lorig Patent No. 2,592,581 dated April 15, 1952, and 2,772,879 dated Dec. 4, 1956. These rolls have very good centering ability and keep belts or strip passing thereover centered. However, I have found that when used with belt conveyors for handling cement and certain other materials the finely ground cement fills up the peripheral slots or slits. This destroys the centering ability of the rolls. This result is contrary to other operations of the roll where the continual movement of the rubber laminations between the slots or slits forced the contaminates from the slots or slits.

It is therefore an object of my invention to provide a rubber covered self-centering roll which will overcome the disadvantages set forth above.

This and other objects will be more apparent after referring to the following specification and attached drawings, in which:

FIGURE 1 is a view of a conveyor having rolls of my invention therein;

FIGURE 2 is an elevation with parts broken away and shown in section illustrating the preferred embodiment of my invention; and FIGURE 3 is a view, similar to FIGURE 2, showing another embodiment of my invention.

Referring more particularly to the drawings, reference numeral 2 indicates rotatable rolls over which a conveyor belt 4 passes. One of the rolls is driven in the usual manner by means, not shown. The roll 2 has a shaft 6 on which is mounted a sleeve 8 made of rubber, neoprene, leather, fabric or other resilient material. A central peripheral groove 10 is provided in the rubber sleeve 8. A plurality of flexible projections 12 and 14 are provided on both sides of the central peripheral groove 10 with the projections being inclined toward the axis of the roll away from the central peripheral groove. The flexible projections 12 and 14 are formed by separating the rubber sleeve 8 to a depth less than the thickness of the sleeve. The separation may be made by removing part of the rubber as in the above mentioned Patent No. 2,592,581 or by slitting the rubber as in the above mentioned Patent No. 2,772,879. The roll shaft 6 is supported in bearings 16 arranged in housing 18. An extension 20 is provided on the shaft of the driven roller.

According to my invention I provide a plurality of grooves 22 in the sleeve 8 extending transversely of the flexible projections 12 and 14. It is preferred that the grooves 22 extend to the base of the flexible projections 12 and 14. If the roll is to be reversible the grooves 22 are arranged at an angle of 90° to the projections 12 and 14 as shown in FIGURE 2. If the roll is not reversible transverse grooves 22′ may be arranged as shown in FIGURE 3. As there shown, angle 24 between the object approach side of the projections 12 and 14 and the grooves peripheral groove 10 is greater than 90°. This is necessary so as not to affect the centering action of the roll. In one particular embodiment the grooves 22 are arranged at 15° intervals around the periphery of the rolls.

In operation, the rolls 2 function to keep the belt 4 in centered position in the usual manner. Even if cement dust has built up between the projections, I have found that continued operation of the conveyor will cause the cement dust to exhaust from the sides of the roll through the grooves 22. Thus, the centering action of the rolls is not adversely affected.

While two embodiments of my invention have been shown and described it will be apparent that other adaptations and modifications may be made without departing from the scope of the following claims.

I claim:

1. The combination of a rotatable roll and a belt passing around a substantial arc thereof, said roll having a central peripheral groove and a plurality of flexible projections on its outer periphery arranged on both sides of the central peripheral groove, said projections being inclined toward the axis of the roll away from the said central peripheral groove, said roll having a plurality of grooves therein extending transversely of said flexible projections, the angle between the belt approach side of at least one of the projections and its peripheral groove side groove being at least 90°.

2. The combination of claim 1 in which the angle between the belt approach side of the projections and the peripheral groove is 90°.

3. The combination of claim 1 in which the roll has a rubber covering and the flexible projections are formed by separating the rubber to a depth less than the thickness of the rubber.

References Cited

UNITED STATES PATENTS

| 2,592,581 | 4/1952 | Lorig | 226—3 |
| 2,642,914 | 6/1953 | Palko et al. | 152—209 |
| 2,891,594 | 6/1959 | Ford | 152—209 |
| 3,143,841 | 8/1964 | Kirtland | 152—209 X |

FOREIGN PATENTS 755,839  8/1956  Great Britain.

M. HENSON WOOD, Jr., *Primary Examiner.*

J. N. ERLICH, *Assistant Examiner.*